US011505006B2

(12) United States Patent
Miura (10) Patent No.: US 11,505,006 B2
(45) Date of Patent: Nov. 22, 2022

(54) TYRE (71) Applicant: Sumitomo Rubber Industries, Ltd., Hyogo (JP)

(72) Inventor: Akiko Miura, Kobe (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 618 days.

(21) Appl. No.: 16/561,293

(22) Filed: Sep. 5, 2019

(65) Prior Publication Data
US 2020/0094627 A1 Mar. 26, 2020

(30) Foreign Application Priority Data

Sep. 20, 2018 (JP) .............................. JP2018-176396

(51) Int. Cl.
*B60C 11/03* (2006.01)
*B60C 11/12* (2006.01)

(52) U.S. Cl.
CPC ...... *B60C 11/0302* (2013.01); *B60C 11/0304* (2013.01); *B60C 11/0309* (2013.01); *B60C 11/0327* (2013.01); *B60C 11/1236* (2013.01); *B60C 2011/0346* (2013.01); *B60C 2011/0353* (2013.01); *B60C 2011/0362* (2013.01)

(58) Field of Classification Search
CPC ............. B60C 11/0304; B60C 11/0302; B60C 11/0306; B60C 11/1232; B60C 11/12; B60C 11/0309; B60C 11/0327; B60C 2011/0395; B60C 2011/0362; B60C 2011/0346; B60C 2011/0341;

(Continued)

(56) References Cited

U.S. PATENT DOCUMENTS

2017/0096033 A1  4/2017 Taniguchi

FOREIGN PATENT DOCUMENTS

DE  10 2005 058 365 A1  6/2007
DE  10 2016 117 823 A1  4/2017

(Continued)

OTHER PUBLICATIONS

The extended European search report issued by the European Patent Office dated Feb. 3, 2020, which corresponds to European Patent Application No. 19195412.2-1012 and is related to U.S. Appl. No. 16/561,293.

*Primary Examiner* — Steven D Maki
*Assistant Examiner* — Philip N Schwartz
(74) *Attorney, Agent, or Firm* — Studebaker & Brackett PC

(57) ABSTRACT

A tyre includes a tread portion provided with an outer main groove, an inner main groove, and a middle main groove. Each of the main grooves has a pair of groove edges arranged on both sides in a tyre axial direction and extending in a tyre circumferential direction. At least one of the groove edges includes circumferential portions extending in the tyre circumferential direction and axial portions inclined at larger angles than the circumferential portions with respect to the tyre circumferential direction. When an axial portion total length is a sum of axial lengths of the axial portions included in the main grooves, an axial portion total lengths L1, L2, and L3 of the outer main groove, the middle main groove, and the inner main groove, respectively, satisfy Expressions (1) and (2) shown below;

$L1 > L3$   Ex. (1)

$L1 \geq L2 \geq L3$   Ex. (2).

17 Claims, 7 Drawing Sheets

(58) Field of Classification Search
CPC ..... B60C 2011/0353; B60C 2011/0372; B60C 2011/0383; B60C 2200/14
See application file for complete search history.

(56) References Cited

FOREIGN PATENT DOCUMENTS

| | | | | |
|---|---|---|---|---|
| EP | 2 505 387 A1 | | 10/2012 | |
| EP | 2 881 264 A1 | | 6/2015 | |
| EP | 2881264 A1 | * | 6/2015 | ......... B60C 11/0304 |
| JP | H0911712 A | * | 1/1997 | ......... B60C 11/1218 |
| JP | 2010-013099 A | | 1/2010 | |
| JP | 2011-051431 A | | 3/2011 | |
| JP | 2011051431 A | * | 3/2011 | .............. B60C 11/11 |

* cited by examiner

TYRE

TECHNICAL FIELD

The present invention relates to a tyre.

BACKGROUND ART

Unexamined Japanese Patent Application Publication No. 2010-13099 has disclosed a tyre having circumferential grooves whose groove edges each consist of first inclined walls and second inclined walls and are provided with point heights in which each of connection portions between the first inclined walls and the second inclined walls is configured as a V-shape.

The tyre has a tread pattern in which three to five bent portions of this point heights are provided per one pitch of the tread pattern. Thereby, it is possible that both the reduction of tyre noise and the improvement of snow performance are achieved.

SUMMARY OF THE INVENTION

However, in recent years, the opportunity to drive on a wet road surface has been increasing due to the influence of global warming, for example. For this reason, there has been a demand for the improvement of drainage performance in addition to noise performance of a tyre.

The present invention was made in view of the above, and a primary object thereof is to provide a tyre having the noise performance and the drainage performance improved in a good balance.

In one aspect of the present invention, a tyre includes a tread portion having, when the tyre is mounted on a vehicle, an outer tread edge positioned on an outer side of the vehicle and an inner tread edge positioned on an inner side of the vehicle, wherein the tread portion is provided with a plurality of main grooves extending continuously in a tyre circumferential direction, the main grooves include an outer main groove arranged closest to the outer tread edge, an inner main groove arranged closest to the inner tread edge, and a middle main groove arranged between the outer main groove and the inner main groove, each of the main grooves has a pair of groove edges arranged on both sides in a tyre axial direction and extending in the tyre circumferential direction, at least one of the pair of the groove edges includes a plurality of circumferential portions extending in the tyre circumferential direction and a plurality of axial portions inclined at larger angles than the circumferential portions with respect to the tyre circumferential direction, and when a sum of axial lengths of the axial portions included in the main grooves is referred to as an axial portion total length, an axial portion total length L1 of the outer main groove, an axial portion total length L2 of the middle main groove, and an axial portion total length L3 of the inner main groove satisfy an Expression (1) and an Expression (2) shown below;

$$L1 > L3 \quad \text{Ex. (1)}$$

$$L1 \geq L2 \geq L3 \quad \text{Ex. (2)}.$$

In another aspect of the invention, it is preferred that the outer main groove has an outer first groove edge positioned on a side of the outer tread edge, the outer first groove edge includes the circumferential portions, the circumferential portions of the outer first groove edge include first circumferential portions arranged on a side of the middle main groove and second circumferential portions arranged on the side of the outer tread edge of the first circumferential portions.

In another aspect of the invention, it is preferred that the tread portion is provided with a plurality of outer shoulder lateral grooves arranged in the tyre circumferential direction and each connecting between the outer main groove and the outer tread edge, the tread portion includes a plurality of outer shoulder blocks defined by the outer main groove, the outer tread edge, and the outer shoulder lateral grooves, in each of the outer shoulder blocks, one of block edges extending in the tyre circumferential direction on the side of the middle main groove is provided with the first circumferential portion, and a length in the tyre circumferential direction of each of the first circumferential portions is 35% or more and 55% or less of a length in the tyre circumferential direction of each of the outer shoulder blocks.

In another aspect of the invention, it is preferred that the outer first groove edge includes the axial portions, the axial length of each of the axial portions of the outer first groove edge is 10% or less of a width in the tyre axial direction of each of the outer shoulder blocks.

In another aspect of the invention, it is preferred that the outer main groove has an outer second groove edge positioned on a side of the middle main groove, the outer second groove edge includes the circumferential portions and the axial portions, and each of the circumferential portions of the outer second groove edge is inclined with respect to the tyre circumferential direction.

In another aspect of the invention, it is preferred that an angle with respect to the tyre circumferential direction of each of the circumferential portions of the outer second groove edge is 5 degrees or more and 15 degrees or less.

In another aspect of the invention, it is preferred that the axial portions of the outer second groove edge include first axial portions and second axial portions each having the axial length larger than that of each of the first axial portions, and the first axial portions and the second axial portions are arranged alternately in the tyre circumferential direction.

In another aspect of the invention, it is preferred that the tread portion is provided with an outer middle land region defined between the outer main groove and the middle main groove, and a sum of the axial lengths of the first axial portions and the second axial portions is 10% or more and 25% or less of a width in the tyre axial direction of the outer middle land region.

In another aspect of the invention, it is preferred that the axial portion total length L1 of the outer main groove is 150% or more and 250% or less of the axial portion total length L3 of the inner main groove.

In another aspect of the invention, it is preferred that the inner main groove has an inner first groove edge positioned on a side of the inner tread edge and an inner second groove edge positioned on a side of the middle main groove, and each of the inner first groove edge and the inner second groove edge has the circumferential portions and the axial portions.

In another aspect of the invention, it is preferred that in each of the inner first groove edge and the inner second groove edge, the circumferential portions include inner first circumferential portions and inner second circumferential portions arranged alternately in the tyre circumferential direction, the inner second circumferential portions are arranged on a side of a groove center line of the inner main groove of the inner first circumferential portions, in each of the inner first groove edge and the inner second groove edge, the axial portions include inner first axial portions and inner second axial portions, and from both ends of each of the inner second circumferential portions, a respective one of the inner first axial portions and a respective one of the inner second axial portions extend.

In another aspect of the invention, it is preferred that the tread portion is provided with an inner shoulder land region defined between the inner main groove and the inner tread edge, and a sum of the axial lengths of the inner first axial portions and the inner second axial portions of the inner first groove edge and the inner first axial portions and the inner second axial portions of the inner second groove edge is 5% or more and 15% or less of a width in the tyre axial direction of the inner shoulder land region.

In another aspect of the invention, it is preferred that the outer main groove includes an outer first groove edge positioned on a side of the outer tread edge and an outer second groove edge positioned on the side of the middle main groove, the outer main groove has an outer linear portion extending continuously and linearly in the tyre circumferential direction between an inner end on the side of the middle main groove of the outer first groove edge and an outer end on the side of the outer tread edge of the outer second groove edge, the inner main groove has an inner linear portion extending continuously and linearly in the tyre circumferential direction between an inner end on the side of the middle main groove of the inner first groove edge and an outer end on the side of the inner tread edge of the inner second groove edge, and a width in the tyre axial direction of the outer linear portion is smaller than a width in the tyre axial direction of the inner linear portion.

In another aspect of the invention, it is preferred that the width in the tyre axial direction of the outer linear portion is 70% or more and 90% or less of the width in the tyre axial direction of the inner linear portion.

DESCRIPTION OF THE PREFERRED EMBODIMENT

An embodiment of the present invention will now be described below in detail in conjunction with accompanying drawings.

Figure 1:
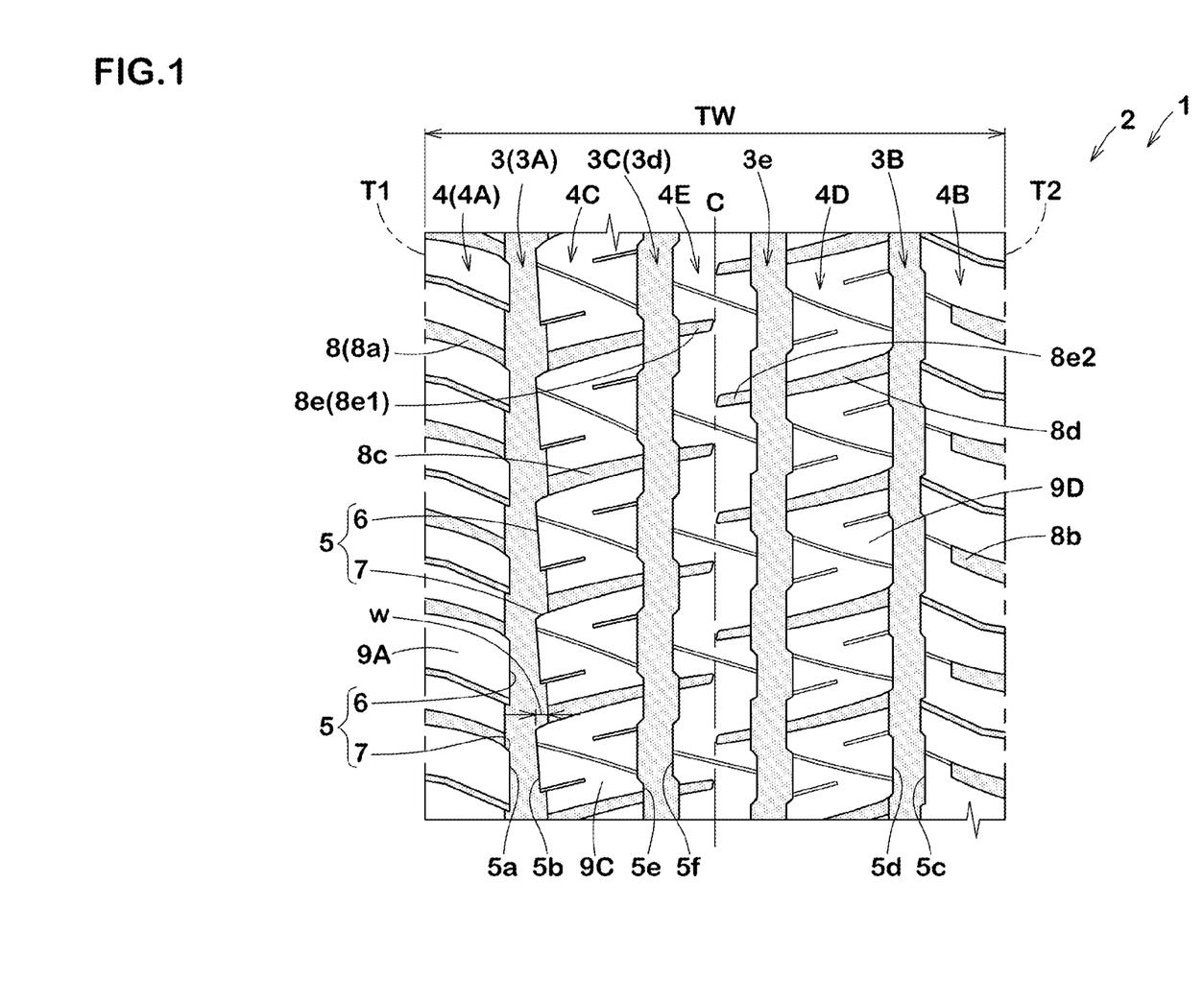
FIG. 1 is a development view of a tread portion of a tyre according to an embodiment of the present invention.

FIG. 1 is a development view of a tread portion 2 of a tyre 1 showing an embodiment of the present invention. In this embodiment, an all-season pneumatic tyre for a four-wheel drive vehicle is shown as a preferred embodiment. However, it is needless to say that the present invention can be applied to the tyre 1 of other categories including a pneumatic tyre for a light truck and a pneumatic tyre for heavy load.

The tread portion 2 in this embodiment has a left-right asymmetric pattern whose position when mounted on a vehicle is specified. The mounting position of the tyre 1 on a vehicle is indicated by letters or marks on at least one of sidewall portions (not shown), for example. In FIG. 1, when the tyre 1 is mounted on a vehicle, the left side thereof corresponds to the outer side of the vehicle, and the right side thereof corresponds to the inner side of the vehicle.

The tread portion 2 has an outer tread edge (T1) positioned, when the tyre is mounted on a vehicle, on the outer side of the vehicle and an inner tread edge (T2) positioned, when the tyre is mounted on the vehicle, on the inner side of the vehicle.

The tread edges (T1) and (T2) are defined as outermost ground contacting positions in a tyre axial direction when the tyre 1 in a standard state is in contact with a flat surface with zero camber angle by being loaded with a standard tyre load. The standard state is a state in which the tyre is mounted on a standard rim (not shown), inflated to a standard inner pressure, and loaded with no tyre load. A width in the tyre axial direction between the tread edges (T1) and (T2) is defined as a tread width (TW). In this specification, unless otherwise noted, dimensions and the like of various parts of the tyre are values measured in the standard state.

The "standard rim" is a wheel rim specified for the concerned tyre by a standard included in a standardization system on which the tyre is based, for example, the "normal wheel rim" in JATMA, "Design Rim" in TRA, and "Measuring Rim" in ETRTO.

The "standard inner pressure" is air pressure specified for the concerned tyre by a standard included in a standardization system on which the tyre is based, for example, the "maximum air pressure" in JATMA, maximum value listed in the "TIRE LOAD LIMITS AT VARIOUS COLD INFLATION PRESSURES" table in TRA, and "INFLATION PRESSURE" in ETRTO.

The "standard tyre load" is a tyre load specified for the concerned tyre by a standard included in a standardization system on which the tyre is based, for example, the "maximum load capacity" in JATMA, maximum value listed in "TIRE LOAD LIMITS AT VARIOUS COLD INFLATION PRESSURES" table in TRA, and "LOAD CAPACITY" in ETRTO.

As shown in FIG. 1, the tread portion 2 in this embodiment is provided with a plurality of main grooves 3 extending continuously in a tyre circumferential direction. The main grooves 3 in this embodiment include an outer main groove (3A) arranged closest to the outer tread edge (T1), an inner main groove (3B) arranged closest to the inner tread edge (T2), and middle main grooves (3c) arranged between the outer main groove (3A) and the inner main groove (3B). In FIG. 1, the grooves and sipes are shown shaded for convenience.

The middle main grooves (3c) in this embodiment include a first middle main groove (3d) arranged on a side of the outer tread edge (T1) and a second middle main groove (3e) arranged on closer to the inner tread edge (T2) than the first middle main groove (3d). The first middle main groove (3d) and the second middle main groove (3e) in this embodiment are arranged spaced apart on both sides of a tyre equator (C). As just described, in this embodiment, the outer main groove (3A) and the first middle main groove (3d) are arranged on the side of the outer tread edge (T1) of the tyre equator (C) and the inner main groove (3B) and the second middle main groove (3e) are arranged on the side of the inner tread edge (T2) of the tyre equator (C). Note that each of the first middle main groove (3d) and the second middle main groove (3e) is explained as the middle main groove (3c)

unless specifically mentioned since they have substantially the same configuration in this embodiment. Further, each of the middle main grooves (3c) is not limited to such an embodiment.

The tread portion 2 is provided with a plurality of land regions 4 divided by the main grooves 3 configured as such. The land regions 4 in this embodiment include an outer shoulder land region (4A), an inner shoulder land region (4B), an outer middle land region (4C), and an inner middle land region (4D). The outer shoulder land region (4A) in this embodiment is arranged between the outer main groove (3A) and the outer tread edge (T1). The inner shoulder land region (4B) in this embodiment is arranged between the inner main groove (3B) and the inner tread edge (T2). The outer middle land region (4C) in this embodiment is arranged between the outer main groove (3A) and the first middle main groove (3d). The inner middle land region (4D) in this embodiment is arranged between the inner main groove (3B) and the second middle main groove (3e). Further, the tread portion 2 in this embodiment is provided with a crown land region (4E) arranged between the first middle main groove (3d) and the second middle main groove (3e).

Each of the main grooves 3 has a pair of groove edges 5 arranged on both sides in the tyre axial direction and extending in the tyre circumferential direction. The outer main groove (3A) in this embodiment has an outer first groove edge (5a) positioned on the side of the outer tread edge (T1) and an outer second groove edge (5b) positioned on the side of the middle main groove (3c). The inner main groove (3B) in this embodiment has an inner first groove edge (5c) positioned on the side of the inner tread edge (T2) and an inner second groove edge (5d) positioned on the side of the middle main groove (3c). The middle main grooves (3c) has a middle first groove edge (5e) positioned on the side of the outer tread edge (T1) and a middle second groove edge (5f) positioned on the side of the inner tread edge (T2).

In each of the main grooves 3, at least one of the pair of the groove edges 5 includes a plurality of circumferential portions 6 each extending in the tyre circumferential direction and a plurality of axial portions 7 each inclined at an angle larger than each of the circumferential portions 6 with respect to the tyre circumferential direction. The axial portions 7 configured as such have axial components along the tyre axial direction and disturb vibration of air in the grooves, therefore, generation of air column resonance is suppressed. Further, the axial portions 7 exert large shearing force on a muddy road, for example, therefore, excellent off-road performance is exerted.

When a sum ($\Sigma w$) of axial lengths (w) of the plurality of the axial portions 7 included in the main grooves 3 is referred to as an axial portion total length, an axial portion total length L1 of the outer main groove (3A), an axial portion total length L2 of the middle main grooves (3C), and an axial portion total length L3 of the inner main groove (3B) satisfy an Expression (1) and an Expression (2) shown below. Note that, in FIG. 1, as a representative, the axial lengths (w) of the axial portions 7 of the outer second groove edge (5b) is shown.

$L1 > L3$ \hfill Ex. (1)

$L1 \geq L2 \geq L3$ \hfill Ex. (2).

The influence of noise generated by the main grooves 3 is larger on the outer side of a vehicle than on the inner side of a vehicle. Thereby, when the Expression (1) is satisfied, the air flow in the outer main groove (3A) is disturbed, therefore, the generation of the air column resonance is suppressed. Thereby, the noise performance is improved. Further, when the Expression (1) is satisfied, drainage resistance due to the axial portions 7 is decreased in the inner main groove (3B), therefore, it is possible that the drainage performance is improved. In particular, when the tyre 1 is mounted in a negative camber, large ground contact pressure is applied to the side of the inner main groove (3B), therefore, the drainage performance is further improved.

Since the middle main groove (3C) is arranged on the inner side of the vehicle than the outer main groove (3A), the influence on the noise performance is smaller than that of the outer main groove (3A). Further, the middle main groove (3C) is arranged on the outer side of the vehicle than the inner main groove (3B), therefore, when the tyre is mounted in a negative camber, the influence of the drainage performance becomes smaller on the side of the middle main grooves (3C) than on the side of the inner main groove (3B). Thereby, when the Expression (2) is satisfied, the improvement effect of the drainage performance and the noise performance by the middle main grooves (3C) is maintained high. Therefore, the tyre 1 has excellent drainage performance and excellent noise performance in a good balance.

In order to effectively exert the effects described above, it is preferred that the axial portion total length L1 of the outer main groove (3A) is 150% or more and 250% or less of the axial portion total length L3 of the inner main groove (3B).

Figure 2:
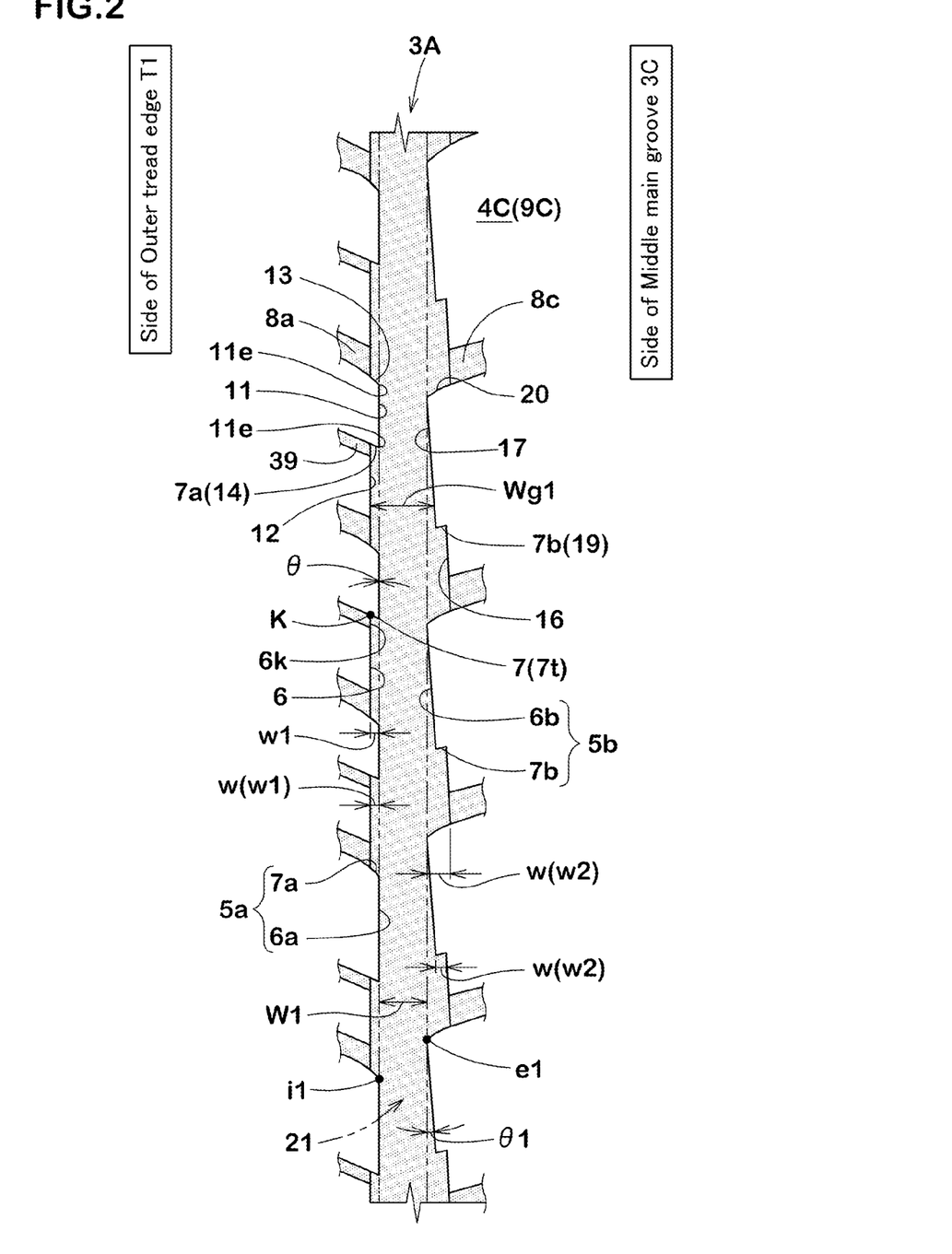
FIG. 2 is an enlarged view of an outer main groove of FIG. 1.
Figure 3:
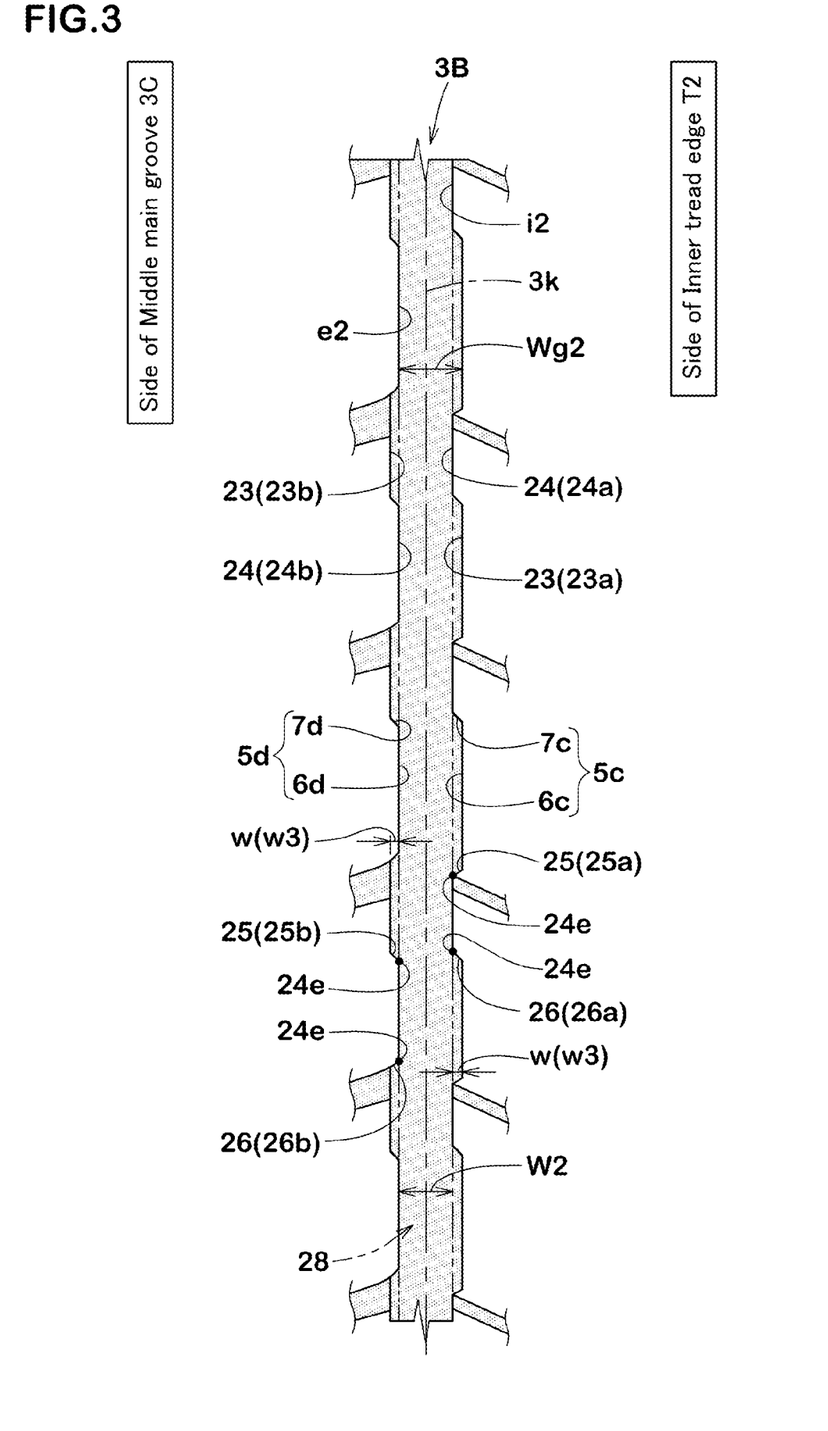
FIG. 3 is an enlarged view of the inner main groove of FIG. 1.
Figure 4:
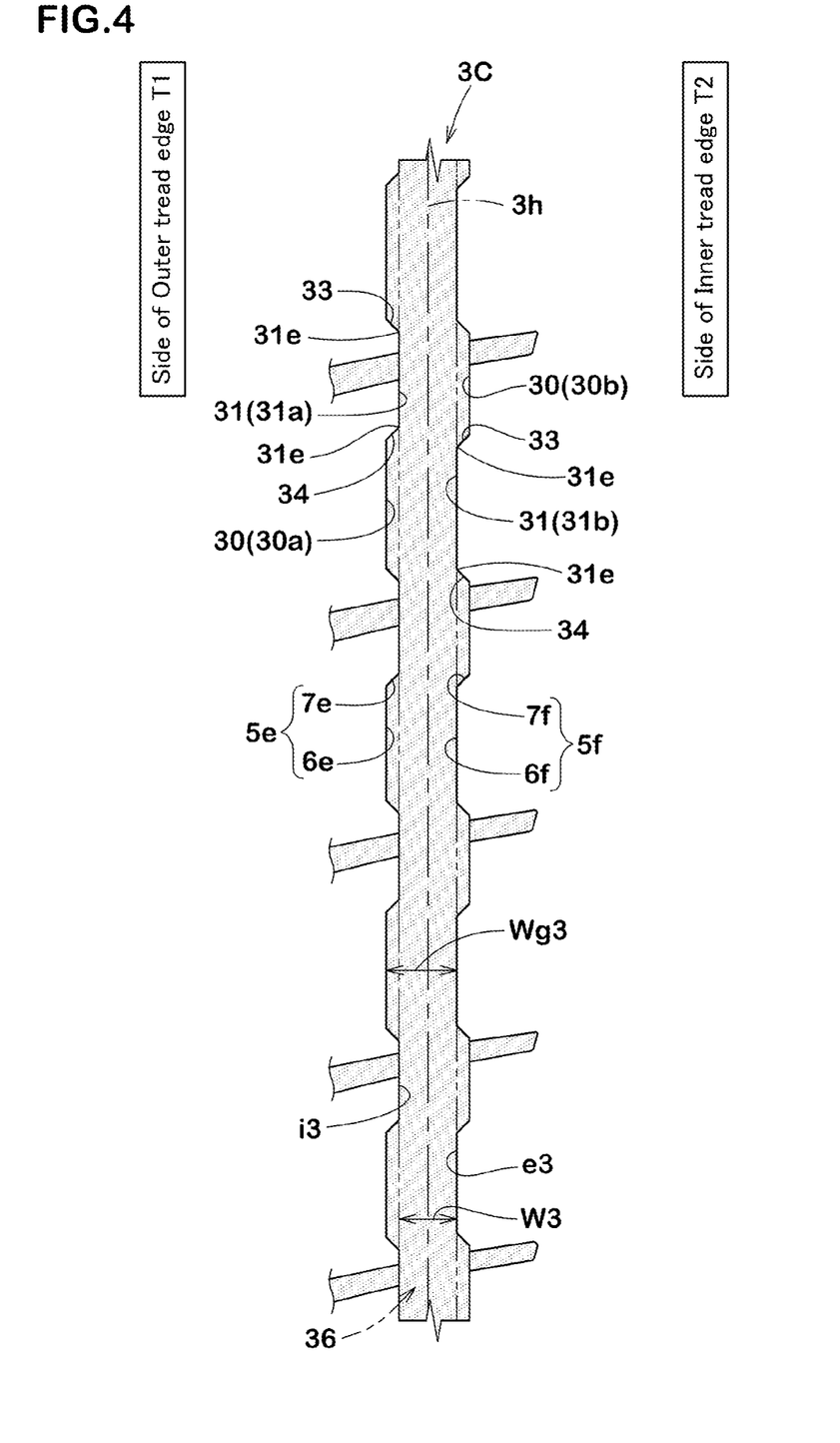
FIG. 4 is an enlarged view of a middle main groove of FIG. 1.

Each of the main grooves 3 in this embodiment includes the circumferential portions 6 and the axial portions 7 in the groove edges 5 on both sides. Thereby, the effects described above are further exerted. FIG. 2 is an enlarged view of the outer main groove (3A). As shown in FIG. 2, the outer first groove edge (5a) in this embodiment includes a plurality of circumferential portions (6a) and a plurality of axial portions (7a). The outer second groove edge (5b) in this embodiment includes a plurality of circumferential portions (6b) and a plurality of axial portions (7b). FIG. 3 is an enlarged view of the inner main groove (3B). As shown in FIG. 3, the inner first groove edge (5c) in this embodiment includes a plurality of circumferential portions (6c) and a plurality of axial portions (7c). The inner second groove edge (5d) in this embodiment includes a plurality of circumferential portions (6d) and a plurality of axial portions (7d). FIG. 4 is an enlarged view of the middle main grooves (3c). As shown in FIG. 4, the middle first groove edge (5e) in this embodiment includes a plurality of circumferential portions (6e) and a plurality of axial portions (7e). The middle second groove edge (5f) in this embodiment includes a plurality of circumferential portions (6f) and a plurality of axial portions (7f). Each of the circumferential portions 6 and the axial portions 7 in this embodiment extends linearly. Note that the configuration of each of the groove edges 5 is not limited to such an embodiment.

As shown in FIG. 1, the tread portion 2 is provided with a plurality of lateral grooves 8. The lateral grooves 8 in this embodiment include outer shoulder lateral grooves (8a), inner shoulder lateral grooves (8b), outer middle lateral grooves (8c), inner middle lateral grooves (8d), and crown lateral grooves (8e). In this embodiment, a plurality of the outer shoulder lateral grooves (8a), a plurality of the inner shoulder lateral grooves (8b), a plurality of the outer middle lateral grooves (8c), a plurality of the inner middle lateral grooves (8d), and a plurality of the crown lateral grooves (8e) are respectively arranged in the tyre circular direction.

Each of the outer shoulder lateral grooves (8a) in this embodiment extends so as to connect between the outer main groove (3A) and the outer tread edge (T1). Thereby, the outer shoulder land region (4A) includes a plurality of outer shoulder blocks (9A) defined by the outer main groove (3A), the outer tread edge (T1), and the outer shoulder lateral grooves (8a).

Each of the inner shoulder lateral grooves (8b) in this embodiment extends from the inner tread edge (T2) toward the inner main groove (3B) to terminate within the inner shoulder land region (4B).

Each of the outer middle lateral grooves (8c) in this embodiment extends so as to connect between the outer main groove (3A) and the first middle main groove (3d). Thereby, the outer middle land region (4C) includes a plurality of outer middle blocks (9c) defined by the outer main groove (3A), the first middle main groove (3d), and the outer middle lateral grooves (8c).

Each of the inner middle lateral grooves (8d) in this embodiment extends so as to connect between the inner main groove (3B) and the second middle main groove (3e). Thereby, the inner middle land region (4D) includes a plurality of inner middle blocks (9D) defined by the inner main groove (3B), the second middle main groove (3e), and the inner middle lateral grooves (8d).

The crown lateral grooves (8e) include first crown lateral grooves (8e1) and second crown lateral grooves (8e2). Each of the first crown lateral grooves (8e1) in this embodiment extends from the first middle main groove (3d) toward the second middle main groove (3e) to terminate within the crown land region (4E). Each of the second crown lateral grooves (8e2) in this embodiment extends from the second middle main groove (3e) toward the first middle main groove (3d) to terminate within the crown land region (4E).

As shown in FIG. 2, the circumferential portions (6a) of the outer first groove edge (5a) in this embodiment include first circumferential portions 11 arranged on a side of the middle main grooves (3C) and second circumferential portions 12 arranged on a side of the outer tread edge (T1) of the first circumferential portions 11. The first circumferential portions 11 and the second circumferential portions 12 are arranged alternately in the tyre circumferential direction, for example.

Each of the first circumferential portions 11 and the second circumferential portions 12 in this embodiment extends along the tyre circumferential direction. The first circumferential portions 11 and the second circumferential portions 12 configured as such decrease the drainage resistance, therefore, the drainage performance is maintained high. In this specification, the expression "along the tyre circumferential direction" includes not only an embodiment of extending at an angle θ of 0 degrees with respect to the tyre circumferential direction but also an embodiment of extending at the angle θ of less than 5 degrees with respect to the tyre circumferential direction.

Figure 5:
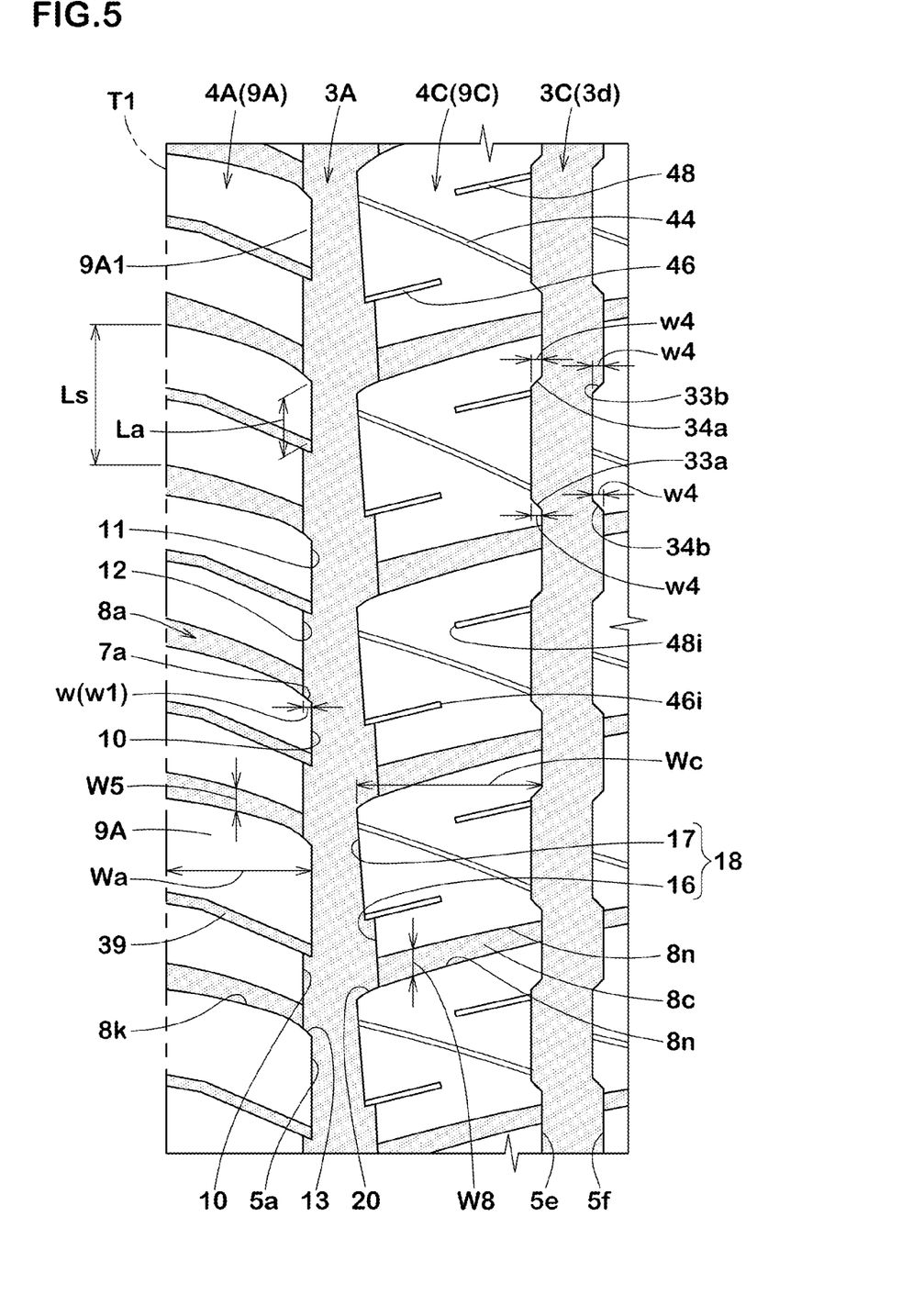
FIG. 5 is an enlarged view of an outer shoulder land region and an outer middle land region of FIG. 1.

FIG. 5 is an enlarged view of the outer shoulder land region (4A) and the outer middle land region (4C). As shown in FIG. 5, each of the outer shoulder blocks (9A) in this embodiment has a block edge 10 extending in the tyre circumferential direction on the side of the middle main groove (3C). This block edge 10 overlaps with the outer first groove edge (5a) of the outer main groove (3A).

Each of the first circumferential portions 11 is formed on the block edge 10 of a respective one of the outer shoulder blocks (9A). It is preferred that a length (La) in the tyre circumferential direction of each of the first circumferential portions 11 is 35% or more and 55% or less of a length (Ls) in the tyre circumferential direction of each of the outer shoulder blocks (9A). Thereby, the rigidity of a block portion (9A1) including the first circumferential portions 11 arranged on the side of the middle main groove (3C) is maintained high, therefore, the shearing force on off-road such as a muddy road and the like is maintained. Each of the block edges 10 of the outer shoulder blocks (9A) in this embodiment is provided with one first circumferential portion 11 and one second circumferential portion 12.

It is preferred that an axial length (w1) of each of the axial portions (7a) of the outer first groove edge (5a) in this embodiment is 10% or less of a (maximum) width (Wa) in the tyre axial direction of each of the outer shoulder blocks (9A). The axial portions (7a) configured as such maintain the drainage performance high. Note that, in order to improve the off-road performance by exerting traction, it is preferred that the axial length (w1) of each of the axial portions (7a) is 5% or more of the width (Wa) in the tyre axial direction of each of the outer shoulder blocks (9A).

As shown in FIG. 2, the axial portions (7a) of the outer first groove edge (5a) in this embodiment extend from both ends (11e) of the first circumferential portions 11 toward the outer tread edge (T1). The axial portions (7a) in this embodiment include first axial portions 13 connected with the outer shoulder lateral grooves (8a) and second axial portions 14 connected with outer shoulder shallow grooves 39 described later. The axial portions (7a) configured as such have the function of guiding the water flowing in the outer main groove (3A) to the outer shoulder lateral grooves (8a) and the outer shoulder shallow grooves 39, therefore, the drainage performance is improved.

As in this embodiment, when the axial lengths (w) of the axial portions 7 are not clear because the axial portions 7 are connected with the lateral grooves, the shallow grooves, and sipes described later, the axial lengths (w) are defined as follows. The axial length (w) of each of the axial portions 7 is a length in the tyre axial direction between one end (7t) of each of the axial portions 7 and an intersection position (K) where the axial portion 7 intersects with a virtual circumferential portion (6k) obtained by smoothly extending the circumferential portion 6 adjacent in the tyre circumferential direction to the axial portion 7.

Each of the circumferential portions (6b) of the outer second groove edge (5b) is inclined with respect to the tyre circumferential direction. The circumferential portions (6b) configured as such have components in the tyre axial direction, therefore, the traction during running off-road is increased.

In order to effectively exert the above-mentioned effects, it is preferred that an angle θ1 of each of the circumferential portions (6b) of the outer second groove edge (5b) is 5 degrees or more and 15 degrees or less with respect to the tyre circumferential direction. When the angle θ1 of each of the circumferential portions (6b) is larger than 15 degrees, the drainage resistance is increased, therefore, it is possible that the drainage performance is deteriorated. When the angle θ1 of each of the circumferential portions (6b) is less than 5 degrees, components in the tyre axial direction is decreased, therefore, it is possible that the off-road performance is deteriorated. The outer second groove edge (5b) is positioned on the side of the tyre equator (C) of the outer first groove edge (5a), therefore, lateral force applied to the outer second groove edge (5b) during cornering is relatively small. Therefore, by inclining each of the circumferential portions (6b) of the outer second groove edge (5b) by the angle θ1, although the outer middle land region (4C) has relatively low land region rigidity on the side of the outer main groove (3A), a groove width (Wg1) in the tyre axial direction of the outer main groove (3A) can be varied. As a result, the disturbance effect of the air flow in the outer main groove (3A) is increased.

Each of the circumferential portions (6b) of the outer second groove edge (5b) in this embodiment is inclined to one side with respect to the tyre circumferential direction. The circumferential portions (6b) include first circumferential portions 16 and second circumferential portions 17 arranged on the side of the outer tread edge (T1) of the first circumferential portions 16, for example. The first circumferential portions 16 and the second circumferential portions 17 in this embodiment are arranged alternately in the tyre circumferential direction. The outer second groove edge (5b) configured as such are helpful for making the axial lengths of the axial portions (7b) large, therefore, the vibration of the air in the outer main groove (3A) is effectively disturbed. The first circumferential portions 16 and the second circumferential portions 17 in this embodiment constitute block edges 18 (shown in FIG. 5) of the outer middle blocks (9C). Each of the block edges 18 in this embodiment is configured to include one first circumferential portion 16 and one second circumferential portions 17.

The axial portions (7b) of the outer second groove edge (5b) in this embodiment include first axial portions 19 and second axial portions 20 each having a larger axial length than that of each of the first axial portions 19. The first axial portions 19 and the second axial portions 20 in this embodiment are arranged alternately in the tyre circumferential direction. In the outer second groove edge (5b) configured as such, each of the first axial portions 19 ensures smooth flow of the water in the first circumferential portion 16 and the second circumferential portion 17 arranged on both sides in the tyre circumferential direction of the first axial portion 19. Further, the second axial portions 20 have large axial lengths (w), therefore, the effect of suppressing the generation of the air column resonance is high, thereby, the noise performance is improved. Therefore, the drainage performance and the noise performance are improved in a good balance.

It is preferred that a total L4 of axial lengths (w2) of one of the first axial portions 19 and one of the second axial portions 20 of the outer second groove edge (5b) is 10% or more and 25% or less of a width (Wc) (shown in FIG. 5) in the tyre axial direction of the outer middle land region (4C). When the total L4 is less than 10% of the width (Wc) in the tyre axial direction, it is possible that the noise performance is deteriorated. When the total L4 is more than 25% of the width (Wc) in the tyre axial direction, it is possible that the drainage performance is deteriorated.

The outer main groove (3A) has an outer linear portion 21 extending continuously and linearly in the tyre circumferential direction between an inner end (i1) on the side of the middle main grooves (3c) of the outer first groove edge (5a) and an outer end (e1) on the side of the outer tread edge (T1) of the outer second groove edge (5b). The outer linear portion 21 configured as such enables smooth drainage, therefore, the drainage performance is maintained high.

As shown in FIG. 3, the circumferential portions (6c) of the inner first groove edge (5c) and the circumferential portions (6d) of the inner second groove edge (5d) of the the inner main groove (3B) include inner first circumferential portions 23 and inner second circumferential portions 24 arranged on a side of a groove center line (3k) of the inner main groove (3B) of the inner first circumferential portions 23. The inner first circumferential portions 23 and the inner second circumferential portions 24 in this embodiment are arranged alternately in the tyre circumferential direction. The groove center line (3k) is a line extending linearly in parallel with the tyre circumferential direction at a center position in the tyre axial direction between an inner end (i2) on the side of the middle main grooves (3c) of the inner first groove edge (5c) and an outer end (e2) on the side of the inner tread edge (T2) of the inner second groove edge (5d).

Each of the inner first circumferential portions 23 and the inner second circumferential portions 24 in this embodiment extends along the tyre circumferential direction. The inner first circumferential portions 23 and the inner second circumferential portions 24 configured as such decrease the drainage resistance in the inner main groove (3B).

Inner first circumferential portions (23a) of the inner first groove edge (5c) and inner second circumferential portions (24b) of the inner second groove edge (5d) in this embodiment are arranged at positions overlapping in the tyre circumferential direction. Inner second circumferential portions (24a) of the inner first groove edge (5c) and inner first circumferential portions (23b) of the inner second groove edge (5d) in this embodiment are arranged at positions overlapping in the tyre circumferential direction. The inner main groove (3B) in this embodiment is formed such that a groove width (Wg2) thereof in the tyre axial direction is substantially the same over the entire tyre circumferential direction. The inner main groove (3B) configured as such has high drainage performance.

The axial portions (7c) of the inner first groove edge (5c) and the axial portions (7d) of the inner second groove edge (5d) include inner first axial portions 25 and inner second axial portions 26 extending from both ends (24e) of the inner second circumferential portions 24. In the inner first groove edge (5c) and the inner second groove edge (5d) in this embodiment, the inner first axial portions 25 and the inner second axial portions 26 are arranged alternately in the tyre circumferential direction, for example.

It is preferred that a total (L5) of the axial lengths (w3) of the inner first groove edge (5c) and the inner second groove edge (5d) is 5% or more and 15% or less of a width (Wb) (shown in FIG. 6) in the tyre axial direction of the inner shoulder land region (4B). The total (L5) is a sum of the axial lengths (w3) of one inner first axial portion (25a) and one inner second axial portion (26a) of the inner first groove edge (5c) and the axial lengths (w3) of one inner first axial portion (25b) and one inner second axial portion (26b) of the inner second groove edge (5d). Thereby, in the inner main groove (3B), the drainage resistance is maintained low, therefore, excellent drainage performance is exerted particularly when the tyre is mounted in a negative camber.

Each of the inner first axial portions (25a) and each of the inner second axial portions (26a) of the inner first groove edge (5c) in this embodiment has the same axial length (w). Similarly, each of the inner first axial portions (25b) and each of the inner second axial portions (26b) of the inner second groove edge (5d) in this embodiment has the same axial length (w). Further, the inner first axial portions (25a) of the inner first groove edge (5c) in this embodiment are inclined to a direction opposite to the inner second axial portions (26a) with respect to the tyre circumferential direction. Similarly, the inner first axial portions (25b) of the inner second groove edge (5d) in this embodiment are inclined to a direction opposite to the inner second axial portions (26b) with respect to the tyre circumferential direction.

The inner main groove (3B) has an inner linear portion 28 extending continuously and linearly in the tyre circumferential direction between the inner end (i2) on the side of the middle main grooves (3C) of the inner first groove edge (5c) and the outer end (e2) on the side of the inner tread edge (T2)

of the inner second groove edge (5d). The inner linear portion 28 configured as such enables smooth drainage, therefore, the drainage performance is maintained high.

A width (W1) (shown in FIG. 2) in the tyre axial direction of the outer linear portion 21 in this embodiment is configured to be smaller than a width (W2) in the tyre axial direction of the inner linear portion 28. Thereby, on the outer side of the vehicle where the influence of the noise generated in the main grooves 3 is large, it is possible that the generation of the air column resonance in the outer main groove (3A) is effectively suppressed. Further, therefore, smooth drainage in the inner main groove (3B) is enabled, thereby, excellent drainage performance is exerted. In particular, when the tyre 1 is mounted in a negative camber, the above-described effects are exerted effectively.

It is preferred that the width (W1) in the tyre axial direction of the outer linear portion 21 is 70% or more and 90% or less of the width (W2) in the tyre axial direction of the inner linear portion 28. Further, it is preferred that the width (W2) in the tyre axial direction of the inner linear portion 28 is 2% or more and 7% or less of the tread width (TW). Thereby, the drainage performance and the noise performance are improved in a good balance.

As shown in FIG. 4, the circumferential portions (6e) of the middle first groove edge (5e) and the circumferential portions (6f) of the middle second groove edge (5f) of the middle main grooves (3c) are provided with middle first circumferential portions 30 and middle second circumferential portions 31. The middle second circumferential portions 31 in this embodiment are arranged on the side of a groove center line (3h) of the middle main grooves (3c) of the middle first circumferential portions 30. The middle first circumferential portions 30 and the middle second circumferential portions 31 in this embodiment are arranged alternately in the tyre circumferential direction.

Each of the middle first circumferential portions 30 and the middle second circumferential portions 31 in this embodiment extends along the tyre circumferential direction. The middle first circumferential portions 30 and the middle second circumferential portions 31 configured as such decrease the drainage resistance of the middle main grooves (3C).

Middle first circumferential portions (30a) of the middle first groove edge (5e) and middle second circumferential portions (31b) of the middle second groove edge (5f) in this embodiment are arranged at positions overlapping in the tyre circumferential direction. Middle second circumferential portions (31a) of the middle first groove edge (5e) and middle first circumferential portions (30b) of the middle second groove edge (5f) in this embodiment are arranged at positions overlapping in the tyre circumferential direction. The middle main grooves (3C) in this embodiment are formed such that a width (Wg3) thereof in the tyre axial direction is substantially the same over the entire tyre circumferential direction. The middle main grooves (3C) configured as such has high drainage performance.

The axial portions (7e) of the middle first groove edge (5e) and the axial portions (7f) of the middle second groove edge (5f) include middle first axial portions 33 and middle second axial portions 34 extending from both ends (31e) of the middle second circumferential portions 31. In the middle first groove edge (5e) and the middle second groove edge (5f), the middle first axial portions 33 and the middle second axial portions 34 are arranged alternately in the tyre circumferential direction, for example.

As shown in FIG. 5, in the first middle main groove (3d), it is preferred that a total (L6) of axial lengths (w4) of one middle first axial portion (33a) and one middle first axial portion (33b) and the axial lengths (w4) of one middle second axial portion (34a) and one middle second axial portion (34b) is larger than the total (L5) of the inner main groove (3B). Thereby, it is possible that large traction is generated in the first middle main groove (3d) on the outer side of the vehicle where relatively large lateral force is applied to, therefore, the off-road performance is improved. Further, when the tyre 1 is mounted in a negative camber, it is possible that the drainage performance is maintained high. In order to effectively exert such effects, it is preferred that the total (L6) of the axial lengths (w4) of the first middle main groove (3d) is 15% or more and 35% or less of the width (Wc) in the tyre axial direction of the outer middle land region (4C).

Figure 6:
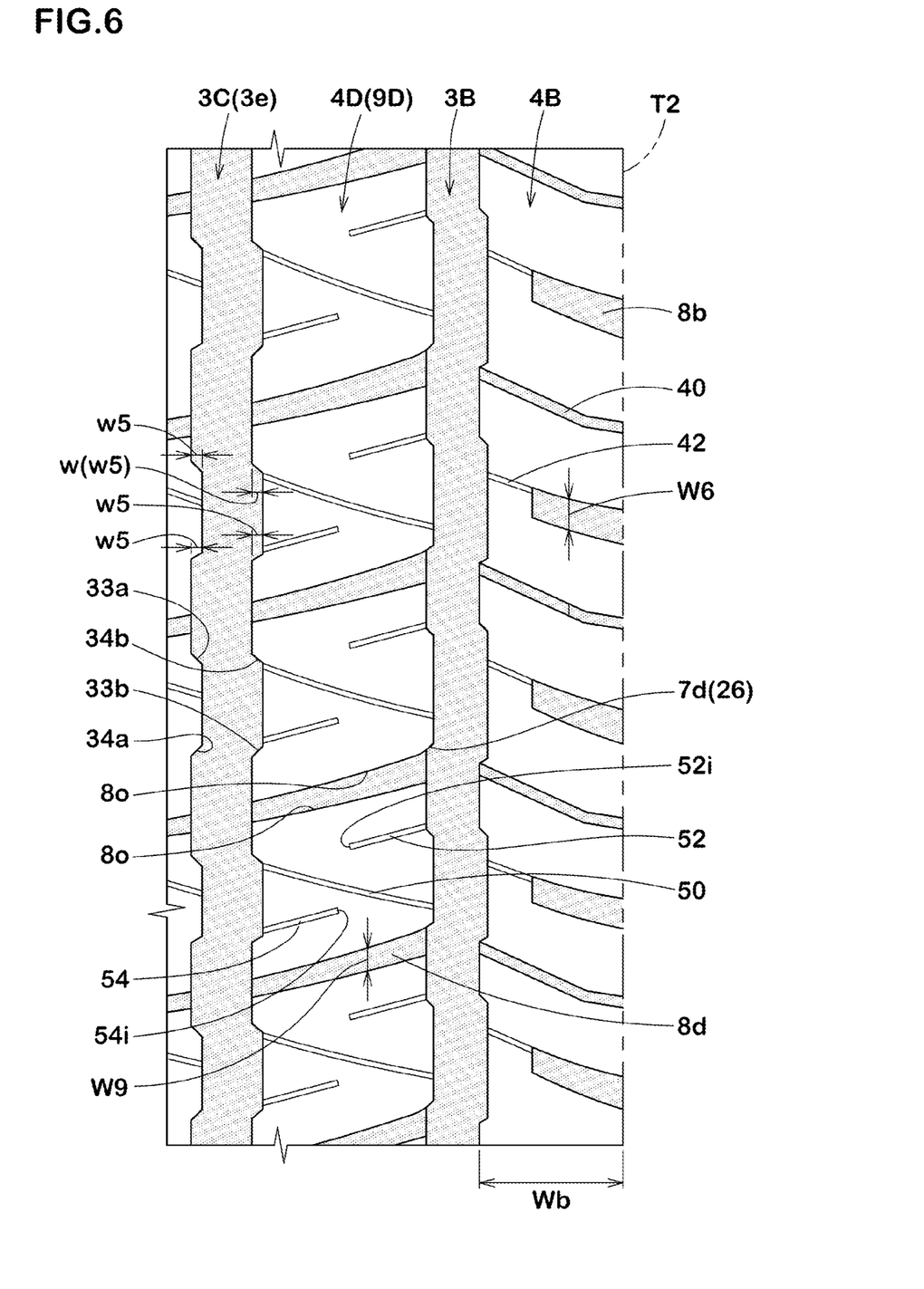
FIG. 6 is an enlarged view of an inner shoulder land region and an inner middle land region of FIG. 1.

As shown in FIG. 6, in the second middle main groove (3e), it is preferred that a total (L7) of axial lengths (w5) of one middle first axial portion (33a) and one middle first axial portion (33b) and the axial lengths (w5) of one middle second axial portion (34a) and one middle second axial portion (34b) is larger than the total (L5) of the inner main groove (3B), for example. Thereby, the above-described effects are exerted more effectively.

As shown in FIG. 5, each of the middle first axial portions (33a) and each of the middle second axial portions (34a) of the middle first groove edge (5e) in this embodiment has the same axial lengths (w4). Similarly, each of the middle first axial portion (33b) and each of the middle second axial portion (34b) of the middle second groove edge (5f) in this embodiment has the same axial lengths (w4). Further, the middle first axial portions (33a) of the middle first groove edge (5e) in this embodiment are inclined to a direction opposite to the middle second axial portions (34a) with respect to the tyre circumferential direction. Similarly, the middle first axial portion (33b) of the middle second groove edge (5f) in this embodiment are inclined to a direction opposite to the middle second axial portion (34b) with respect to the tyre circumferential direction.

As shown in FIG. 4, the middle main grooves (3C) has a middle linear portion 36 extending continuously and linearly in the tyre circumferential direction between an inner end (i3) on the side of the inner tread edge (T2) of the middle first groove edge (5e) and an outer end (e3) on the side of the outer tread edge (T1) of the middle second groove edge (5f). The middle linear portion 36 configured as such enables smooth drainage, therefore, the drainage performance is maintained high.

It is preferred that a width (W3) in the tyre axial direction of the middle linear portion 36 is larger than width (W1) in the tyre axial direction of the outer linear portion 21. Thereby, in the middle linear portion 36 to which large ground contact pressure is applied, it is possible that water in the groove is smoothly discharged, therefore, excellent drainage performance is exerted. It is preferred that the width (W3) in the tyre axial direction of the middle linear portion 36 is about 20% or more and about 140% or less of the width (W1) in the tyre axial direction of the outer linear portion 21. Further, it is preferred that the width (W3) in the tyre axial direction of the middle linear portion 36 is larger than the width (W2) in the tyre axial direction of the inner linear portion 28.

As shown in FIG. 5, a width (W5) in the tyre circumferential direction of the outer shoulder lateral grooves (8a) is increased from the side of the outer main groove (3A) to the side of the outer tread edge (T1). The outer shoulder lateral grooves (8a) configured as such smoothly discharge water in the outer main groove (3A) to the outside of the outer tread edge (T1). Further, during running off-the-road, mud and dirt in the outer shoulder lateral grooves (8a) are smoothly discharged toward the outer tread edge (T1).

Either one of groove edges (8k) of each of the outer shoulder lateral grooves (8a) in this embodiment is smoothly connected with one of the first axial portions 13. Thereby, water in the outer main groove (3A) is guided smoothly into the outer shoulder lateral grooves (8a), therefore, the drainage performance is improved.

The outer shoulder blocks (9A) in this embodiment is provided with the outer shoulder shallow grooves 39 each connecting between the outer main groove (3A) and the outer tread edge (T1). Each of the outer shoulder shallow grooves 39 in this embodiment has a smaller groove depth and a smaller groove width than those of each of the outer shoulder lateral grooves (8a), therefore, decrease in the rigidity of the outer shoulder blocks (9A) is suppressed.

The outer shoulder shallow grooves 39 and the outer shoulder lateral grooves (8a) in this embodiment are inclined in the same direction with respect to the tyre axial direction. Thereby, large decrease in the land region rigidity of the outer shoulder blocks (9A) is suppressed, therefore, it is possible that high traction is generated.

As shown in FIG. 6, a groove width (W6) of each of the inner shoulder lateral grooves (8b) in this embodiment is gradually increased toward the inner tread edge (T2). The inner shoulder lateral grooves (8b) configured as such smoothly discharge water, or mud and dirt in the inner shoulder lateral grooves toward the inner tread edge (T2), therefore, the drainage performance and the off-road performance are improved.

The inner shoulder land region (4B) in this embodiment is provided with inner shoulder shallow grooves 40 and inner shoulder sipes 42. Each of the inner shoulder shallow grooves 40 in this embodiment connects between the inner main groove (3B) and the inner tread edge (T2). The inner shoulder shallow grooves 40 configured as such improve the drainage performance and the off-road performance. Each of the inner shoulder shallow grooves 40 has a smaller groove width (not shown) and a smaller groove depth (not shown) than those of each of the inner shoulder lateral grooves (8b). Note that, in this specification, the "sipe" means an incision having a width of less than 1.5 mm and is distinguished from a groove which has a width of 1.5 mm or more.

Each of the inner shoulder sipes 42 in this embodiment connects between the inner main groove (3B) and a respective one of the inner shoulder lateral grooves (8b). The inner shoulder sipes 42 configured as such promote deformation of the inner shoulder lateral grooves (8b), therefore, effects of discharging mud and dirt by the inner shoulder lateral grooves (8b) is more effectively exerted.

The inner shoulder lateral grooves (8b), the inner shoulder shallow grooves 40, and the inner shoulder sipes 42 in this embodiment are inclined in the same direction with respect to the tyre axial direction.

As shown in FIG. 5, the outer middle lateral grooves (8c) in this embodiment are inclined with respect to the tyre axial direction and each has a groove width (W8) gradually increased toward the outer tread edge (T1). The outer middle lateral grooves (8c) configured as such shift the timing of contacting the ground of a pair of groove edges (8n) spaced apart in the tyre circumferential direction, therefore, pitch sound is decreased.

Each of the outer middle blocks (9C) in this embodiment includes an outer crossing sipe 44, an outer first interrupted sipe 46, and an outer second interrupted sipe 48. The outer crossing sipe 44 in this embodiment connects between the outer main groove (3A) and the first middle main groove (3d). The outer first interrupted sipe 46 in this embodiment extends from the outer main groove (3A) toward the first middle main groove (3d) to terminate within the outer middle block (9c). The outer second interrupted sipe 48 in this embodiment extends from the first middle main groove (3d) toward the outer main groove (3A) to terminate within the outer middle block (9C).

The outer crossing sipes 44 are inclined to a direction opposite to the outer first interrupted sipes 46 and the outer second interrupted sipes 48 with respect to the tyre axial direction. Thereby, deformation of the outer middle lateral grooves (8c) is promoted, therefore, mud and dirt in the outer middle lateral grooves are smoothly discharged.

In each of the outer middle blocks (9C), the outer first interrupted sipe 46 and the outer second interrupted sipe 48 do not overlap in the tyre circumferential direction and an inner end (46i) of the outer first interrupted sipe 46 and an inner end (48i) of the outer second interrupted sipe 48 are spaced apart from each other in the tyre axial direction. Thereby, excessive decrease in the rigidity of the outer middle blocks (9C) is suppressed.

Either one of the groove edges (8n) of each of the outer middle lateral grooves (8c) in this embodiment is smoothly connected with a respective one of the second axial portions 20. Thereby, the groove edge (8n) and the second axial portion 20 form one smooth edge, therefore, it is possible that large traction is obtained.

As shown in FIG. 6, the inner middle lateral grooves (8d) in this embodiment are inclined with respect to the tyre axial direction and each has a groove width (W9) gradually increased toward the inner tread edge (T2). The inner middle lateral grooves (8d) configured as such shift the timing of contacting the ground of a pair of groove edges (8o) spaced apart in the tyre circumferential direction, therefore, pitch sound is decreased.

Each of inner middle blocks (9D) in this embodiment includes an inner crossing sipe 50, an inner first interrupted sipe 52, and an inner second interrupted sipe 54. The inner crossing sipe 50 in this embodiment connects between the inner main groove (3B) and the second middle main groove (3e). The inner first interrupted sipe 52 in this embodiment extends from the inner main groove (3B) toward the second middle main groove (3e) to terminate within the inner middle block (9D). The inner second interrupted sipe 54 in this embodiment extends from the second middle main groove (3e) toward the inner main groove (3B) to terminate within the inner middle block (9D).

The inner crossing sipes 50 in this embodiment are inclined in a direction opposite to the inner first interrupted sipes 52 and the inner second interrupted sipes 54 with respect to the tyre axial direction. In each of the inner middle blocks (9D) in this embodiment, the inner first interrupted sipe 52 and the inner second interrupted sipe 54 do not overlap in the tyre circumferential direction and an inner end (52i) of the inner first interrupted sipe 52 and an inner end (54i) of the inner second interrupted sipe 54 are spaced apart from each other in the tyre axial direction.

Either one of the groove edges (8o) of each of the inner middle lateral grooves (8d) in this embodiment is smoothly connected with a respective one of the axial portions (7d) (inner second axial portions 26). Thereby, the groove edge (8o) and the axial portions (7d) form one smooth edge, therefore, it is possible that large traction is obtained.

Figure 7:
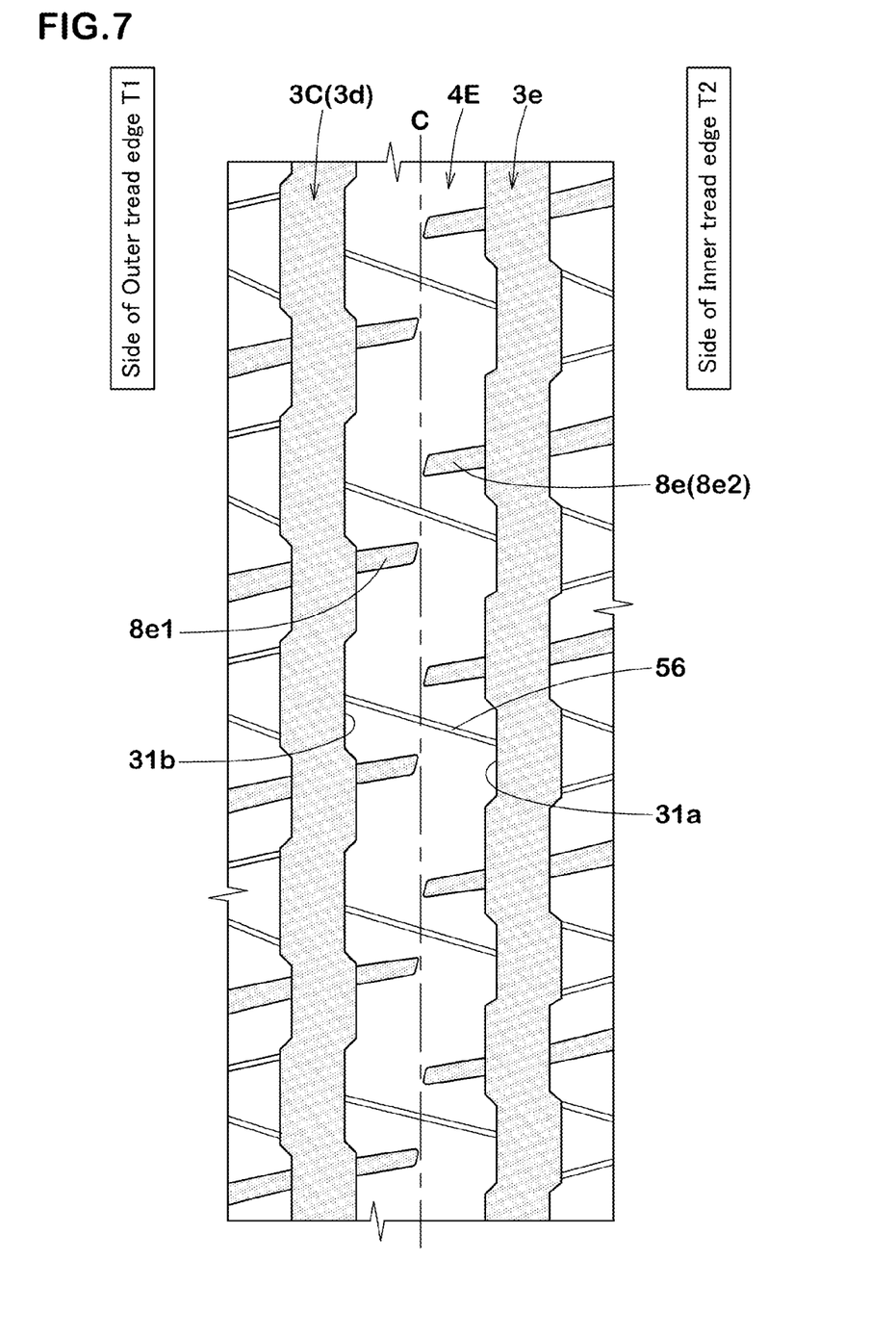
FIG. 7 is an enlarged view of a crown land region of FIG. 1.

As shown in FIG. 7, each of the first crown lateral grooves (8e1) in this embodiment extends from the first middle main groove (3d) toward the second middle main groove (3e) to terminate without reaching the tyre equator (C). Each of the second crown lateral grooves (8e2) in this embodiment extends from the second middle main groove (3e) toward the first middle main groove (3d) to terminate without reaching the tyre equator (C). The crown lateral grooves (8e) configured as such maintain the land region rigidity of the crown land region (4E) in the vicinity of the tyre equator (C) high, therefore, excellent off-road performance is exerted.

The first crown lateral grooves (8e1) and the second crown lateral grooves (8e2) in this embodiment are arranged alternately in the tyre circumferential direction. The first crown lateral grooves (8e1) and the second crown lateral grooves (8e2) are arranged spaced away such that they do not overlap in the tyre axial direction, for example. The first crown lateral grooves (8e1) and the second crown lateral grooves (8e2) in this embodiment are inclined in the same direction with respect to the tyre axial direction. Thereby, the land region rigidity of the crown land region (4E) is maintained high.

The crown land region (4E) is provided with crown crossing sipes 56 each connecting between the first middle main groove (3d) and the second middle main groove (3e). The crown crossing sipes 56 in this embodiment are inclined in a direction opposite to the first crown lateral grooves (8e1). Each of the crown crossing sipes 56 connects between a respective one of the middle second circumferential portions (31b) of the first middle main groove (3d) and a respective one of the middle second circumferential portions (31a) of the second middle main groove (3e), for example. Further, the crown crossing sipes 56 are arranged so as not to overlap with the first crown lateral grooves (8e1) and the second crown lateral grooves (8e2) in the tyre circumferential direction. The crown crossing sipes 56 configured as such promote deformation of the crown lateral grooves (8e) while suppressing large decrease in the land region rigidity of the crown land region (4E), therefore, discharge of mud and dirt in the crown lateral grooves is made easy.

While detailed description has been made of the tyre as an embodiment of the present invention, it is needless to say that the present invention can be embodied in various forms without being limited to the illustrated embodiment.

WORKING EXAMPLES (EXAMPLES)

Pneumatic tyres of size 265/55R20 having the basic pattern shown in FIG. 1 were made by way of test according to the specifications listed in Table 1, and each of the test tyres was tested for the drainage performance, the noise performance, and the off-road performance. Common specifications of the test tyres and the test methods were as follows. Note that the axial portion total length L3 was the same for all Examples and References.

Tyre rim: 20×8.53
Tyre inner pressure: 230 kPa
Test vehicle: 4WD-car with displacement of 4600 cc
Tyre: mounted in a negative camber (all wheels)

<Drainage Performance>

The test tyres were mounted on the test vehicle on all wheels and then while a test driver drove the test vehicle on a wet road surface of a test course, the drainage performance (aquaplaning performance) related to grip and stability was evaluated by the test driver's feeling. The results are indicated by an evaluation point based on Reference 1 being 100, wherein a larger numerical value is better.

<Noise Performance> while the test driver drove the test vehicle with the test tyres mounted on all wheels on a dry asphalt road surface of the test course, the noise performance was evaluated by the test driver's feeling. The results are indicated by an evaluation point based on the Reference 1 being 100, wherein a larger numerical value is better.

<Off-Road Performance>

While the test driver drove the test vehicle with the test tyres mounted on all wheels on a soft road surface of mud and dirt of the test course, the off-road performance related to the traction and the stability was evaluated by the test driver's feeling. The results are indicated by an evaluation point based on the reference 1 being 100, wherein a larger numerical value is better. The test results and the like are shown in Table 1.

TABLE 1

|  | Ref. 1 | Ref. 2 | Ex. 1 | Ex. 2 | Ex. 3 | Ex. 4 | Ex. 5 | Ex. 6 | Ex. 7 |
| --- | --- | --- | --- | --- | --- | --- | --- | --- | --- |
| Axial portion total length L1/ Axial portion total length L3 [%] | 100 | 200 | 200 | 200 | 200 | 200 | 200 | 200 | 200 |
| Axial portion total length L1/ Axial portion total length L2 [%] | 100 | 80 | 130 | 130 | 130 | 130 | 130 | 130 | 130 |
| Length (La)/Length (Ls) [%] | 45 | 45 | 45 | 30 | 55 | 45 | 45 | 45 | 45 |
| Angle θ1 [degree] | 10 | 10 | 10 | 10 | 10 | 5 | 20 | 10 | 10 |
| Total L4/width (wc) [%] | 15 | 15 | 15 | 15 | 15 | 15 | 15 | 5 | 20 |
| Drainage performance [evaluation point: larger is better] | 100 | 90 | 110 | 108 | 106 | 115 | 104 | 113 | 106 |
| Noise performance [evaluation point: larger is better] | 100 | 120 | 110 | 110 | 112 | 107 | 112 | 108 | 112 |
| off-road performance [evaluation point: larger is better] | 100 | 100 | 110 | 110 | 112 | 108 | 112 | 109 | 110 |

From the test results, it was confirmed that the drainage performance and the noise performance were improved in a good balance for the tyres in the Examples compared with the tyres in the References. Further, it was confirmed that the tyres in the Examples maintained the off-road performance high.

The invention claimed is:

1. A tyre comprising a tread portion having, when the tyre is mounted on a vehicle, an outer tread edge positioned on an outer side of the vehicle and an inner tread edge positioned on an inner side of the vehicle, wherein
   the tread portion is provided with a plurality of main grooves extending continuously in a tyre circumferential direction,
   the main grooves include an outer main groove arranged closest to the outer tread edge, an inner main groove arranged closest to the inner tread edge, and a middle main groove arranged between the outer main groove and the inner main groove, each of the main grooves has a pair of groove edges arranged on both sides in a tyre axial direction and extending in the tyre circumferential direction,
at least one of the pair of the groove edges includes a plurality of circumferential portions extending in the tyre circumferential direction and a plurality of axial portions inclined at larger angles than the circumferential portions with respect to the tyre circumferential direction,
the inner main groove has an inner first groove edge positioned on a side of the inner tread edge and an inner second groove edge positioned on a side of the middle main groove, and each of the inner first groove edge and the inner second groove edge has the circumferential portions and the axial portions,
in each of the inner first groove edge and the inner second groove edge, the circumferential portions include inner first circumferential portions and inner second circumferential portions arranged alternately in the tyre circumferential direction,
the inner second circumferential portions are arranged on a side of a groove center line of the inner main groove of the inner first circumferential portions,
in each of the inner first groove edge and the inner second groove edge, the axial portions include inner first axial portions and inner second axial portions,
from both ends of each of the inner second circumferential portions, a respective one of the inner first axial portions and a respective one of the inner second axial portions extend,
the tread portion is provided with an inner shoulder land region defined between the inner main groove and the inner tread edge,
the inner shoulder land region is provided with inner shoulder lateral grooves and inner shoulder sipes,
each of the inner shoulder lateral grooves extends from the inner tread edge toward the inner main groove to terminate within the inner shoulder land region,
each of the inner shoulder sipes connects between the inner main groove and a respective one of the inner shoulder lateral grooves, and
when a sum of axial lengths of the axial portions included in the main grooves is referred to as an axial portion total length, an axial portion total length L1 of the outer main groove, an axial portion total length L2 of the middle main groove, and an axial portion total length L3 of the inner main groove satisfy an Expression (1) and an Expression (2) shown below;

$$L1 > L3 \quad \text{Ex. (1)}$$

$$L1 \geq L2 \geq L3 \quad \text{Ex. (2).}$$

2. The tyre according to claim 1, wherein
the outer main groove has an outer first groove edge positioned on a side of the outer tread edge,
the outer first groove edge includes the circumferential portions, and
the circumferential portions of the outer first groove edge include first circumferential portions arranged on a side of the middle main groove and second circumferential portions arranged on the side of the outer tread edge of the first circumferential portions.

3. The tyre according to claim 2, wherein
the tread portion is provided with a plurality of outer shoulder lateral grooves arranged in the tyre circumferential direction and each connecting between the outer main groove and the outer tread edge,
the tread portion includes a plurality of outer shoulder blocks defined by the outer main groove, the outer tread edge, and the outer shoulder lateral grooves,
in each of the outer shoulder blocks,
one of block edges extending in the tyre circumferential direction on the side of the middle main groove is provided with the first circumferential portion, and
a length in the tyre circumferential direction of each of the first circumferential portions is 35% or more and 55% or less of a length in the tyre circumferential direction of each of the outer shoulder blocks.

4. The tyre according to claim 3, wherein
the outer first groove edge includes the axial portions, and
the axial length of each of the axial portions of the outer first groove edge is 10% or less of a width in the tyre axial direction of each of the outer shoulder blocks.

5. The tyre according to claim 1, wherein
the outer main groove has an outer second groove edge positioned on a side of the middle main groove,
the outer second groove edge includes the circumferential portions and the axial portions, and
each of the circumferential portions of the outer second groove edge is inclined with respect to the tyre circumferential direction.

6. The tyre according to claim 5, wherein
an angle with respect to the tyre circumferential direction of each of the circumferential portions of the outer second groove edge is 5 degrees or more and 15 degrees or less.

7. The tyre according to claim 5, wherein
the axial portions of the outer second groove edge include first axial portions and second axial portions each having the axial length larger than that of each of the first axial portions, and
the first axial portions and the second axial portions are arranged alternately in the tyre circumferential direction.

8. The tyre according to claim 7, wherein
the tread portion is provided with an outer middle land region defined between the outer main groove and the middle main groove, and
a sum of the axial lengths of the first axial portions and the second axial portions is 10% or more and 25% or less of a width in the tyre axial direction of the outer middle land region.

9. The tyre according to claim 1, wherein
the axial portion total length L1 of the outer main groove is 150% or more and 250% or less of the axial portion total length L3 of the inner main groove.

10. The tyre according to claim 1, wherein
a sum of the axial lengths of the inner first axial portions and the inner second axial portions of the inner first groove edge and the inner first axial portions and the inner second axial portions of the inner second groove edge is 5% or more and 15% or less of a width in the tyre axial direction of the inner shoulder land region.

11. The tyre according to claim 1, wherein
the outer main groove includes an outer first groove edge positioned on a side of the outer tread edge and an outer second groove edge positioned on the side of the middle main groove,
the outer main groove has an outer linear portion extending continuously and linearly in the tyre circumferential direction between an inner end on the side of the middle main groove of the outer first groove edge and an outer end on the side of the outer tread edge of the outer second groove edge, the inner main groove has an inner linear portion extending continuously and linearly in the tyre circumferential direction between an inner end on the side of the middle main groove of the inner first groove edge and an outer end on the side of the inner tread edge of the inner second groove edge, and a width in the tyre axial direction of the outer linear portion is smaller than a width in the tyre axial direction of the inner linear portion.

12. The tyre according to claim 11, wherein
the width in the tyre axial direction of the outer linear portion is 70% or more and 90% or less of the width in the tyre axial direction of the inner linear portion.

13. The tyre according to claim 1, wherein
the inner first circumferential portions of the inner first groove edge and the inner second circumferential portions of the inner second groove edge are arranged at positions overlapping in the tyre circumferential direction.

14. The tyre according to claim 1, wherein
the inner second circumferential portions of the inner first groove edge and the inner first circumferential portions of the inner second groove edge are arranged at positions overlapping in the tyre circumferential direction.

15. The tyre according to claim 3, wherein
each of the outer shoulder blocks is provided with an outer shoulder shallow groove connecting between the outer main groove and the outer tread edge, and the outer shoulder shallow groove has a smaller depth and a smaller width than those of each of the outer shoulder lateral grooves.

16. The tyre according to claim 15, wherein
the outer shoulder shallow grooves and the outer shoulder lateral grooves are inclined in the same direction with respect to the tyre axial direction.

17. The tyre according to claim 1, wherein
the inner shoulder land region is provided with inner shoulder shallow grooves, each of the inner shoulder shallow grooves connects between the inner main groove and the inner tread edge and has a smaller depth and a smaller width than those of each of the inner shoulder lateral grooves, and the inner shoulder lateral grooves, the inner shoulder shallow grooves, and the inner shoulder sipes are inclined in the same direction with respect to the tyre axial direction.

\* \* \* \* \*